Figure 3:
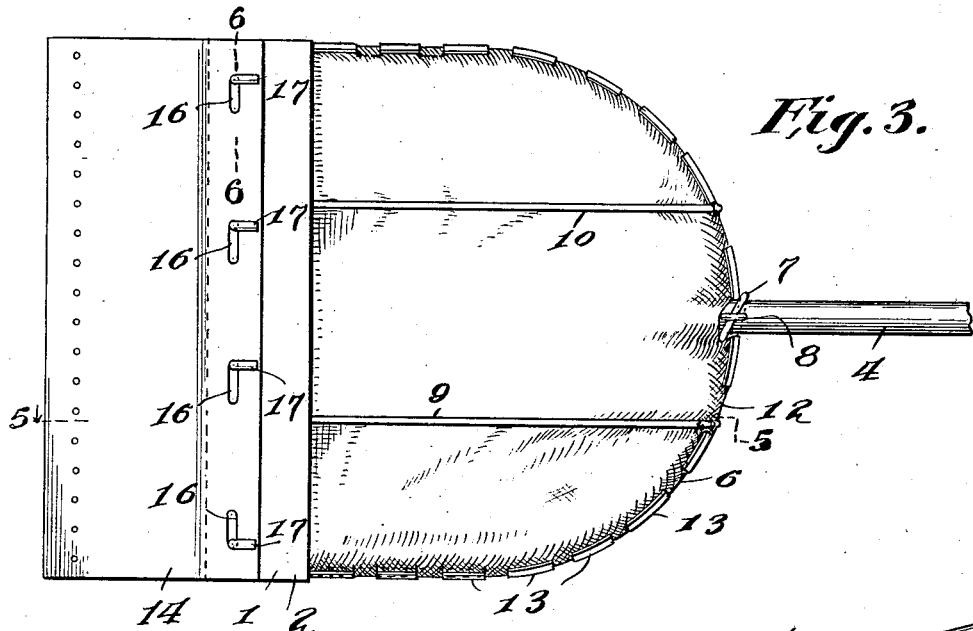

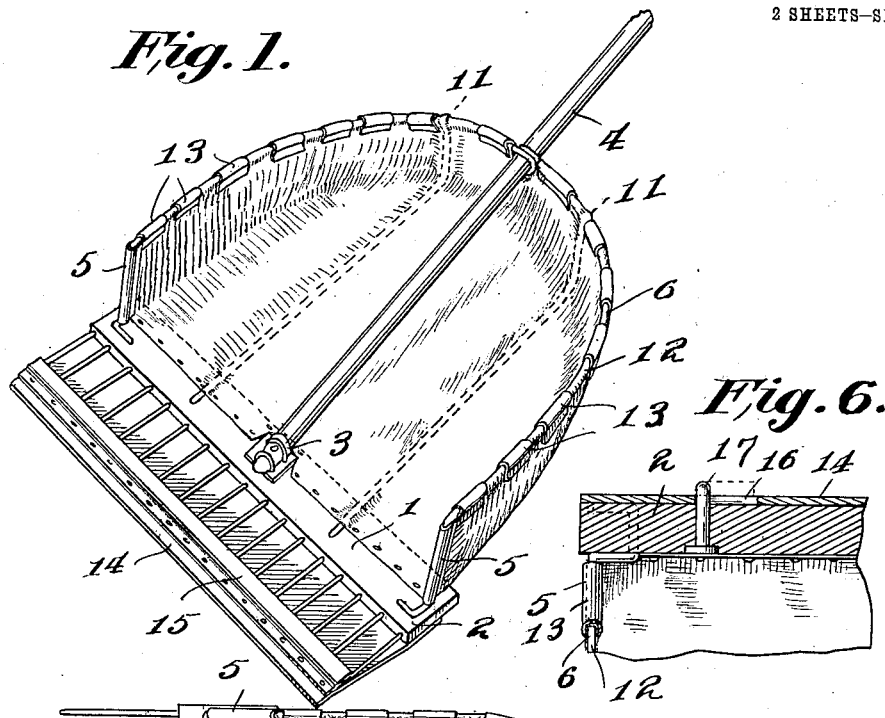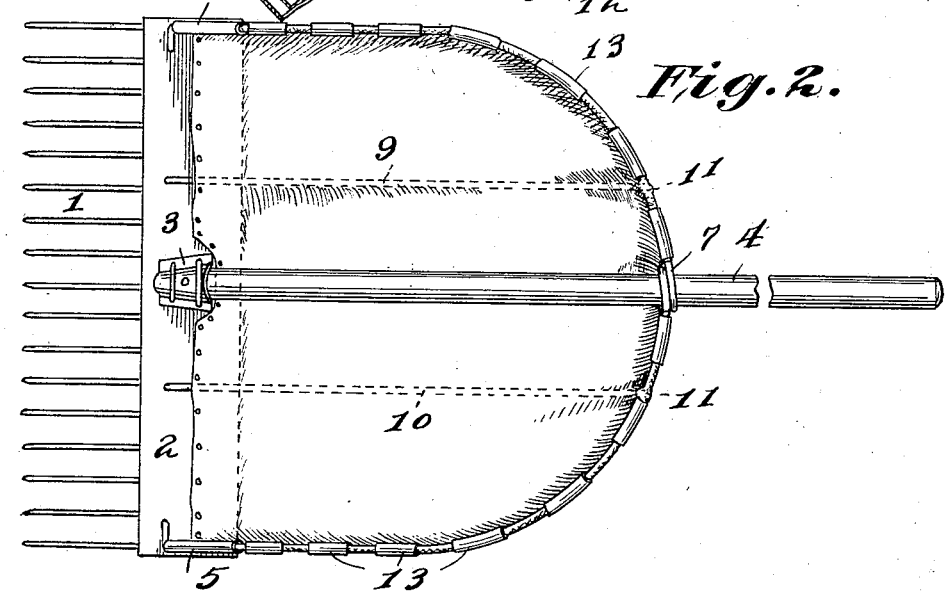

UNITED STATES PATENT OFFICE.

ORSON P. HUISH, OF PAYSON, UTAH.

RAKE.

1,023,849.  Specification of Letters Patent.  Patented Apr. 23, 1912.

Application filed July 19, 1911. Serial No. 639,332.

*To all whom it may concern:*

Be it known that I, ORSON P. HUISH, a citizen of the United States, residing at Payson, in the county of Utah and State of Utah, have invented new and useful Improvements in Rakes, of which the following is a specification.

This invention relates to garden and yard implements.

The object of the invention is to provide an implement of this character embodying a combination rake and shovel and a carrier for the material gathered by the said rake or shovel.

With the above objects in view, and others which will be more apparent as the description of the invention progresses, the improvement resides in the novel construction and arrangement of parts hereinafter fully described and claimed.

In the drawings, accompanying this specification, there has been illustrated a simple and preferred embodiment of the improvement, and in said drawings,—

Figure 4:
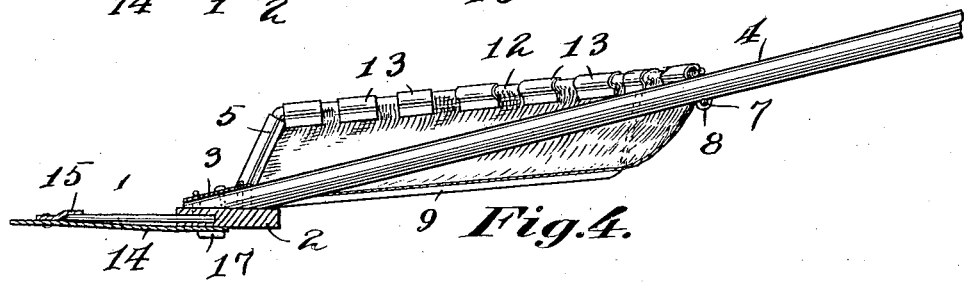
Figure 5:
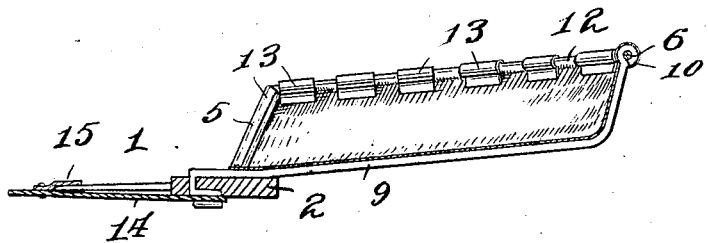

Figure 1 illustrates an implement constructed in accordance with the present invention, the shovel member being shown in its applied position. Fig. 2 is a similar view with the shovel member removed. Fig. 3 is a bottom plan view of the device illustrating the manner of securing the shovel to the rake. Fig. 4 is a central longitudinal sectional view taken through the device as illustrated in Fig. 1. Fig. 5 is a similar sectional view taken upon the line 5—5 of Fig. 3. Fig. 6 is a detail transverse sectional view upon the line 6—6 of Fig. 3.

The improvement contemplates essentially the employment of a rake or toothed member 1. This member is provided with a substantially rectangular connecting plate 2, and the said connecting plate is centrally provided with a socket 3. The socket 3 is adapted to receive and to have retained therein one end of the handle 4. The rectangular plate 2 adjacent its opposite ends is provided with a pair of upstanding parts 5, the said upstanding parts preferably forming the opposite ends of a rearwardly extending U-shaped member or loop 6. The loop as well as its ends is preferably constructed of a single strand of suitable wire and the central portion of the said loop in a plane substantially parallel with that of the socket 3 is bent to provide an eye 7, through which the handle 4 projects, and with which the said handle is connected in any desired manner, such as the employment of a double pointed staple tack 8 as illustrated in the drawings.

The numerals 9 and 10 designate supporting elements for the rear portion of the loop 6. These supporting elements are also each preferably constructed of a single strand of wire, the same having one of their ends secured to the plate 2 and extending rearwardly a suitable distance in a substantially parallel plane with the said plate and from thence curved upwardly and connected with the loop in any desired manner as through the medium of the intergally formed coils or eyes 11.

Secured to the plate 2 as well as to the loop and its upstanding ends 5 is a carrying element 12 of fabric or other material, the said carrier being preferably connected with the loop and its extension through the medium of a plurality of substantially rectangular clips 13, but of course other securing devices may be employed if desired. The carrier 12 is of a formation so as to be effectively supported by the members 9 as well as by the loop and its extensions, and the gathering of the rake may be easily positioned within the carrier by simply tilting the rake and the said gathering may then be conveyed to any desired location.

The numeral 14 designates the shovel attachment for the device. This shovel is of a width corresponding with the width of the plate 2 and the said shovel has its upper face adjacent its outer end provided with a longitudinally extending strip 15. This strip may be formed by bending the said end of the shovel, or may be a separate element as illustrated in the figures of the drawings. The strip as shown in the drawings is secured to the shovel 14 only at its outer end so as to allow the opposite end to be bent upwardly and to provide a pocket between the strip and the shovel for the reception of the teeth of the rake 1. The shovel member is of a length sufficient to engage beneath the plate 2, the said portion adjacent the edge thereof being provided with a plurality of elongated openings 16, while secured to the said under face of the plate 2 are a plurality of turn buckles 17, the same preferably comprising each a rotatable L-shaped member having its off-set portion, or that not connected with the plate 2, arranged so as to be swung into contact with the portions of the shovel adjacent its openings 16 when the shovel is to be secured to the rake, it being of course understood that the members 17 register with and pass through the openings 16 of the shovel when the said shovel is arranged upon the rake.

Having thus fully described the said invention, what I claim is:—

1. In an implement of the class set forth, the combination with a rake embodying a plate having teeth secured thereto, and a handle for the rake, of a frame constructed of a single strand of wire, said frame including a loop having depending ends which are secured adjacent the opposite ends of the plate, the loop being centrally provided with an eye through which the handle of the rake passes and secured to the said handle, curved supports connecting the plate and the loop, a fabric carrier connected with the frame and with the plate, clips for securing the carrier upon the frame, and a detachable shovel member for the rake.

2. In an implement of the class set forth, the combination with a rake embodying a substantially rectangular plate having teeth secured thereto, of a shovel member for the rake, said shovel member having one of its ends formed with a pocket within which is received the ends of the teeth of the rake, the plate having its under face provided with turn buckles, the shovel member having its under face provided with openings adapted to register with the turn buckles, and a carrier connected with the rake.

In testimony whereof I affix my signature in presence of two witnesses.

ORSON P. HUISH.

Witnesses:
  DAVE HUISH,
  W. S. SARGENT.

---

Copies of this patent may be obtained for five cents each, by addressing the "Commissioner of Patents, Washington, D. C."